(12) United States Patent
Turley et al.

(10) Patent No.: US 7,031,653 B1
(45) Date of Patent: Apr. 18, 2006

(54) SWITCH MATRIX FOR SATELLITE PAYLOADS WITH MULTIPLE UPLINK BEAMS AND ON-BOARD SIGNAL PROCESSING

(75) Inventors: Peter John Turley, Redondo Beach, CA (US); Shih-Chang Wu, Alhambra, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/538,030

(22) Filed: Mar. 29, 2000

(51) Int. Cl.
*H04H 1/00* (2006.01)

(52) U.S. Cl. ............... 455/3.02; 455/427; 455/428; 455/445; 455/447; 455/275; 455/12.1; 370/316

(58) Field of Classification Search ............ 455/428, 455/3.02, 275, 12.1, 21, 427, 445, 447; 370/316, 370/323
See application file for complete search history.

(56) References Cited

U.S. PATENT DOCUMENTS 4,425,639 A * 1/1984 Acampora et al. .......... 370/323
4,456,988 A * 6/1984 Nakagome et al. ......... 370/323

(Continued)

FOREIGN PATENT DOCUMENTS

EP 1075094 A2 2/2001

(Continued)

OTHER PUBLICATIONS

H. Maruyama et al., "Onboard Processor for Millimerer . . . System," Proc. of Int'l Conf. On Comm., Geneva, May 23-26, 1993. New York, IEEE, US, vol. 3, pp. 1480-1486, XP010137132.

*Primary Examiner*—Edward F. Urban
*Assistant Examiner*—Dai Phuong
(74) *Attorney, Agent, or Firm*—Gates & Cooper LLP (57) ABSTRACT

A method and apparatus for switching signals through a switch matrix are disclosed. The apparatus comprises an input module and an output module. The input module has a plurality of inputs typically equal to a number of cells in a reuse pattern, and the inputs receiving at least one uplink beam. The input module also has a plurality of outputs, the plurality of outputs is typically equal to the number of subbands in the uplink beam. The output module is coupled to the input module and selectively couples the outputs from the input module to an output of the output module. The method comprises the steps of grouping the uplink signals into a plurality of groups, the number of groups typically equal to a number of cells in the cell-based transmission matrix, where each group comprises a signal from each frequency used in the frequency reuse pattern. Each group of uplink signals is then separated into subband signals, which are then grouped together into groups of similar subband signals. The groups of similar subband signals are then forwarded to demodulators for processing within the satellite system.

10 Claims, 11 Drawing Sheets

U.S. PATENT DOCUMENTS

| | | | |
|---|---|---|---|
| 4,480,328 A * | 10/1984 | Alaria et al. | 370/323 |
| 4,931,802 A * | 6/1990 | Assal et al. | 342/356 |
| 5,220,320 A * | 6/1993 | Assal et al. | 340/2.21 |
| 5,736,959 A * | 4/1998 | Patterson et al. | 342/354 |
| 5,790,529 A | 8/1998 | Haber | |
| 6,006,113 A * | 12/1999 | Meredith | 455/561 |
| 6,198,435 B1 * | 3/2001 | Reudink et al. | 342/373 |
| 6,236,833 B1 * | 5/2001 | Peyrovian | 455/12.1 |
| 6,259,899 B1 * | 7/2001 | Mandell et al. | 455/115.4 |
| 6,377,561 B1 * | 4/2002 | Black et al. | 370/330 |
| 6,408,164 B1 * | 6/2002 | Lazaris-Brunner et al. | 455/12.1 |
| 6,643,294 B1 * | 11/2003 | Cooperman et al. | 370/413 |

FOREIGN PATENT DOCUMENTS

| | | |
|---|---|---|
| EP | 1075094 A3 | 10/2003 |
| WO | WO 97/48197 | 12/1997 |

* cited by examiner

SWITCH MATRIX FOR SATELLITE PAYLOADS WITH MULTIPLE UPLINK BEAMS AND ON-BOARD SIGNAL PROCESSING

BACKGROUND OF THE INVENTION

1. Field of the Invention

This invention relates in general to switch matrices, and in particular to a switch matrix for satellite payloads with multiple uplink beams and on-board signal processing.

2. Description of Related Art

Communications satellites have become commonplace for use in many types of communications services, e.g., data transfer, voice communications, television spot beam coverage, and other data transfer applications. As such, satellites must provide signals to various geographic locations on the Earth's surface. As such, typical satellites use customized antenna designs to provide signal coverage for a particular country or geographic area.

Many satellite payloads contain analog or digital signal processors. Analog processors are typically used to separate and combine different signals into specific channels ("channelize the signals"), and to switch different parts of the ground-to-satellite ("uplink") signal to different satellite-to-ground ("downlink") beams. Digital processors are also used to channelize and switch signals, and may also be used to demodulate, process and remodulate signals. Usually these signal processors are heavy and consume a lot of DC power, so it is advantageous to be as efficient as possible in allocating processing resources to uplink beams.

Typically, the signals ("traffic") in each uplink beam to the satellite are different, since the population and economy in each uplink region is different. If the amount of traffic in each uplink beam is known before the satellite is launched, and does not vary over the life of the satellite, processing resources can be allocated to uplink beams with fixed connections, which eliminates the need for the switch matrix. Typically, however, the amount of traffic in each uplink beam is either unknown beforehand or varies over time, and thus there must be some sort of switch matrix to reallocate and interconnect uplink beams to the on-board satellite processing resources.

Some traditional switch matrix designs, such as the crossbar switch or the Clos switch matrix, were designed for use in telephone switching networks, and are designed for point-to-point connectivity. Other switch matrices have been designed for connections inside a computer or between networked computers. Some of these designs are not suitable for satellite signals at microwave frequencies, because the related art switch matrix designs suffer from isolation problems at microwave frequencies. Other switch matrices do not provide for point-to-multipoint connectivity without excessive signal losses caused by power splitting. Many designs are also difficult to build out of smaller pieces in a modular manner.

It can be seen, then, that there is a need in the art for a switch matrix that is suitable for use in a spacecraft environment. It can also be seen that there is a need in the art for a switch matrix that provides point-to-multipoint connectivity without excessive signal losses. It can also be seen that there is a need in the art for a switch matrix that provides ease of mechanical design and construction to reduce spacecraft costs.

SUMMARY OF THE INVENTION

To overcome the limitations in the prior art described above, and to overcome other limitations that will become apparent upon reading and understanding the present specification, the present invention discloses a method and apparatus for switching signals through a switch matrix. The apparatus comprises an input module and an output module. The input module has a plurality of inputs typically equal to a number of cells in a reuse pattern, and the inputs receiving at least one uplink beam. The input module also has a plurality of outputs, the plurality of outputs is typically equal to the number of subbands in the uplink beam. The output module is coupled to the input module and selectively couples the outputs from the input module to an output of the output module.

The method comprises the steps of grouping the uplink signals into a plurality of groups, the number of uplink signals typically equal to the number of cells in a cell-based transmission matrix and the number of groups typically equal to a number of cells in a reuse pattern in the cell-based transmission matrix, where each group comprises a signal from each frequency used in the frequency reuse pattern. Each group of uplink signals is then separated into subband signals, which are then grouped together into groups of similar subband signals. The groups of similar subband signals are then forwarded to demodulators for processing within the satellite system.

The present invention provides a switch matrix that is suitable for use in a spacecraft environment. The present invention also provides a switch matrix that provides point-to-multipoint connectivity without excessive signal losses. The present invention also provides a switch matrix that provides ease of mechanical design and construction to reduce spacecraft costs.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview of Related Art

Switch matrices are commonly used in many satellite telecommunications systems designs to allow for redeployment of signals onboard the satellite. The switch matrix allows an input signal to be routed to any output desired through the use of crossbar switches or other types of switch matrices.

Some traditional switch matrix designs, such as the crossbar switch or the Clos switch matrix, were designed primarily for telephone switching networks, and are designed for point-to-point connectivity. Other switch matrices were designed for connections inside a computer or between networked computers. Some of these designs are not suitable for microwave signals because of isolation problems, and other matrices do not provide for point-to-multipoint connectivity without excessive losses due to power splitting. Many designs are not easy to build out of smaller pieces in a modular manner.

The present invention is suitable for microwave work, provides for point-to-multipoint connectivity with a greatly reduced amount of power splitting, and can be constructed from smaller pieces in a modular manner.

Figure 1:
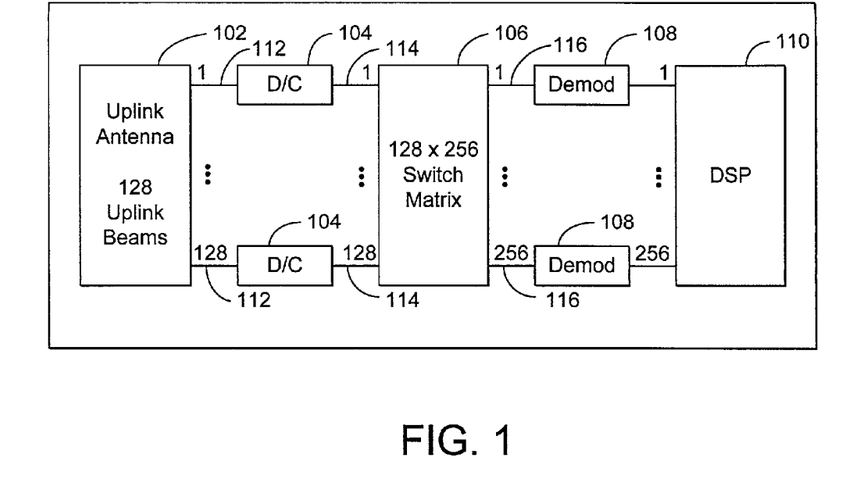
FIG. 1 illustrates an exemplary block diagram of the uplink of a satellite with digital processing.

FIG. 1 illustrates an exemplary block diagram of the uplink of a satellite with digital processing.

The system 100 comprises an uplink antenna 102, downconverters 104, switch matrix 106, demodulators 108, and a digital signal processor (DSP) 110. Uplink antenna 102 receives a number of uplink beams 112, in this case 128 uplink beams 112, which are each fed to individual downconverters 104. Each downconverted uplink signal 114 is input to the switch matrix 106, which routes each signal to a given output of the switch matrix 106. The output signals 116 of the switch matrix are fed into demodulators 108, and then input to DSP 110 for processing. The DSP 110 has the capacity to service a plurality of demodulators 108.

The system 100 is usually employed in a satellite telecommunications system that receives uplink information from transmitters on the ground. These transmitters are assigned in a "cellular" pattern, where each cell transmits information to the satellite within a given frequency band. Each cell within a frequency reuse group of cells uses a different frequency band, and such groups are repeated throughout the cellular pattern to create a frequency-reuse pattern within the totality of cells in the system. Within each cell, the frequency band is divided into subbands. Each subband comprises individual signals from subscriber units, and each subband can contain zero or more signals.

For example, in FIG. 1, each demodulator 108 demodulates one of eight uplink subbands. If the traffic is uniform, each uplink beam 112 will be allocated 2 demodulators 108, and each uplink beam 112 can carry ¼ of its maximum capacity. In such a case, each uplink beam 112 can be hardwired to two demodulators 108 directly without using switch matrix 106, etc. until all 128 uplink beams 112 are connected to demodulators 108.

Typically, however, the traffic is not uniform and each uplink beam 112 will carry a different amount of traffic, which makes switch matrix 106 a necessary part of system 100. Further, the traffic distribution changes during the lifetime of the satellite, possibly changing every hour or so. Switch matrix 106 is used to dynamically allocate demodulators 108 to uplink beams 112. In the example of FIG. 1, a switch matrix 106 with 128 inputs and 256 outputs is needed.

The most straightforward design for the switch matrix 106 of FIG. 1 is a crossbar switch in which every input 114 can be connected to any output 116 in any order, with each signal passing through one switch in the switch matrix 106. However, such a large crossbar switch matrix 106 would require 128*256=32,768 switches, and would be very difficult to manufacture in a modular manner from smaller switches.

The number of switches in switch matrix 106 can be somewhat reduced by using architectures like the Clos architecture, but the resulting matrix would still be difficult to manufacture in a modular manner. Crossbar and Clos design switch matrices 106 are not suitable for the system 100 of FIG. 1, either because they are not suitable for microwave switching networks due to isolation and connectivity problems, or because they cannot satisfy the point-to-multipoint requirements for system 100.

To broadcast one uplink signal 114 to multiple outputs 116, a power splitter is required inside of switch matrix 106. The more the uplink signal 114 is split, the greater the power loss through the switch matrix 106. In power limited applications such as spacecraft, it is vitally important to reduce this power loss as much as possible to reduce the need for amplifiers within the system 100, to reduce both power consumption and weight on board the satellite.

For the switch matrix 106 described in FIG. 1, one uplink signal 114 must have the capability to be broadcast to 8 of the 256 outputs 116. This capability is typically provided by using a 1:256 power divider, followed by a switching network, within switch matrix 106. For satellite applications, this approach leads to unacceptably high losses within the switch matrix 106.

However, switch matrices 106 of the related art were not optimized to take into account how system 100 is typically implemented. First, satellite payloads with multiple uplink beams 112 typically use a frequency reuse scheme such as 4-cell or 7-cell frequency reuse. Adjacent cells within the frequency reuse scheme cannot use the same frequency and, therefore, cannot use the same subbands. This reduces the connectivity requirements of the switch matrix 106, as described herein with respect to the present invention. Second, the demodulators 108 may often be grouped by subband, e.g., some demodulators 108 demodulate only the first subband, other demodulators 108 only the second subband, etc. One input signal 114 must have the capability to be broadcast to all of the different subband demodulator 108 types, but one input signal 114 does not have to be broadcast to more than one demodulator 108 in a given group of demodulators. As such, the switch matrix of the present invention is further reduced in complexity while still providing the interconnections required for system 100.

Overview of the Invention

The invention allows for a flexible allocation of processing resources to uplink beams for satellite payloads with on-board processing, which allows the processor resources to be used more efficiently. This reduction on the complexity of the switch matrix reduces the weight and power required by the processor to accomplish the mission goal. The present invention is simpler than comparable switch matrices and can be constructed from simpler switches allowing it to be used for satellite payloads. The amount of power splitting inside the switch matrix of the present invention is reduced, so it has a lower loss and a lower noise figure than other related art designs.

This invention applies to all satellites with digital or analog processing of signals that divide multiple uplink signals into several subbands. It is most useful when the uplink traffic distribution varies over time or is not well known before launch.

Figure 2:
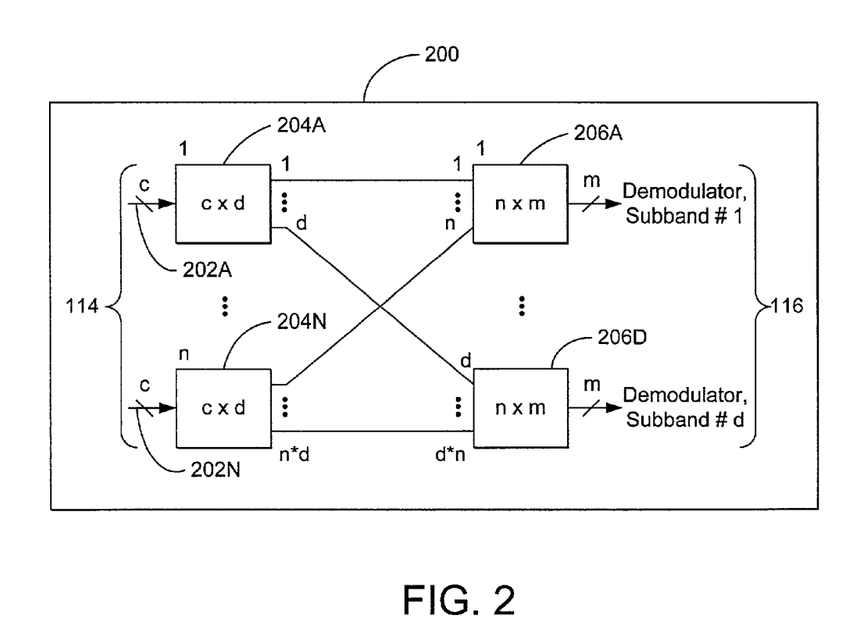
FIG. 2 illustrates the switch matrix of the present invention.

FIG. 2 illustrates the switch matrix of the present invention. A satellite using switch matrix 200 of the present invention uses multiple uplink beams 114 that use c-cell frequency reuse, where c is the number of cells in the reuse pattern. Input signals 202A are therefore input to input switch module 204A, and input signals 202A comprise c uplink beams, which equals one entire reuse pattern. C is typically equal to 3, 4, 7, 9, or 12, but can be other numbers. N is the number of reuse patterns on the ground. As such, the total number of uplink beams 114 is c times n (c*n). To accommodate the entire complement of uplink beams 114, n input switch modules 204A–204N are used to receive all of the can uplink beams 114.

The uplink signals 114 are mulitcarrier, and to accomplish the demodulation, the uplink signal 114 is divided into d subbands. Therefore, each input switch module 204A–204N must provide d outputs. The output switch modules 206A–206D must accept one input from each input switch module 204A–204N, and therefore have n inputs. A demodulator 108 can demodulate one of these d subbands, and m demodulators are devoted to each subband. The total number of demodulators 108 is therefore d*m, and each output switch module 206A–206D must provide m output signals. Therefore, each output switch module is an n*m matrix.

Switch matrix 200 of the present invention comprises n input switch modules 204A–204N, and d output switch modules 206A–206D. Each of the inputs 202A to the input switch module 204A comes from a single uplink reuse group, so that none of the inputs 202A can share an uplink frequency. The switch matrix 200 of the present invention thus has a c*m input capability, and a d*m output capability, which provides proper interconnectivity for the system 100 without excess weight or power consumption.

Input Switch Modules

Figure 3:
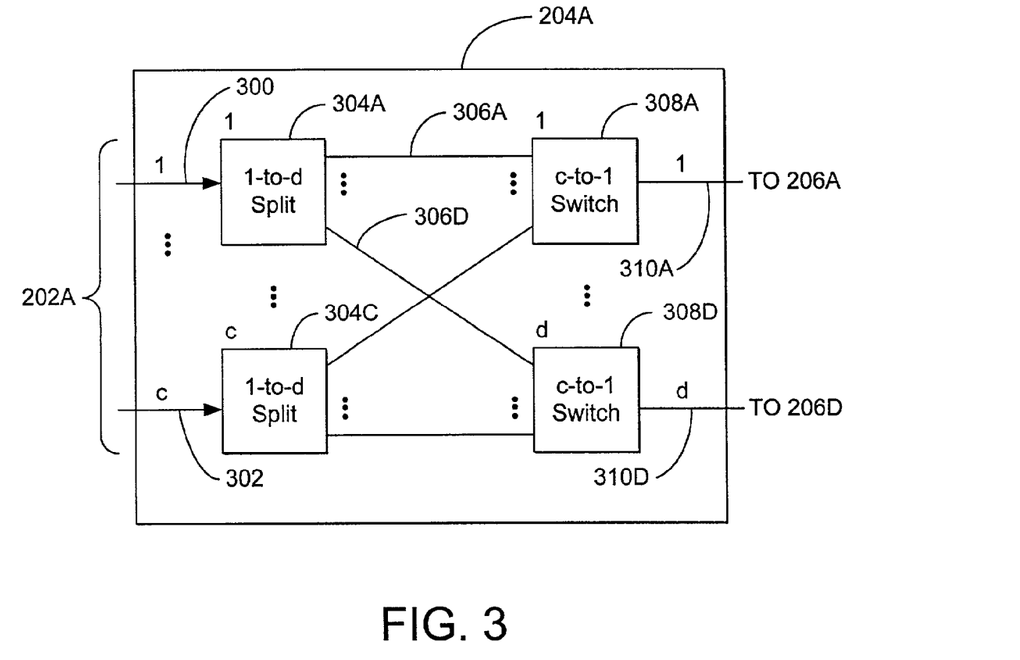
FIG. 3 illustrates the structure of the input switch modules of the present invention.

FIG. 3 illustrates the structure of the input switch modules of the present invention. Each input switch module 204A–204N receives inputs 202A–202N. For clarity, input switch module 204A is shown as a typical design. Signals 202A, which comprise signals 300 and 302, are fed into a plurality, i.e., "c" 1-to-d power splitters 304A–304C. Each power splitter 304A–304C takes a single input signal, e.g., 300, and produces a plurality of substantially equivalent power outputs from signal 300, e.g., 306A–306D. For example, if power splitter 304A was a 1:4 power splitter, and a 100 microwatt (µW) input signal 300 was fed into power splitter 304A, then power splitter 304A would produce four output signals 306A–306D, each approximately a 25 µW signal. There would be some losses through power splitter 306A, which would reduce the 25 mW output power of each signal by some percentage amount. In the related art, a similar input signal would be split 256 times, making each output signal less than 1 µW, which may be difficult to process without amplification.

Each output 306A–306D from each power splitter 304A–304C is fed into a c:1 switch 308A–308D. Since each switch 308A–308D produces only one output 310A–310D, there are d switches 308A–308D in each module 204.

Output Switch Modules

Figure 4:
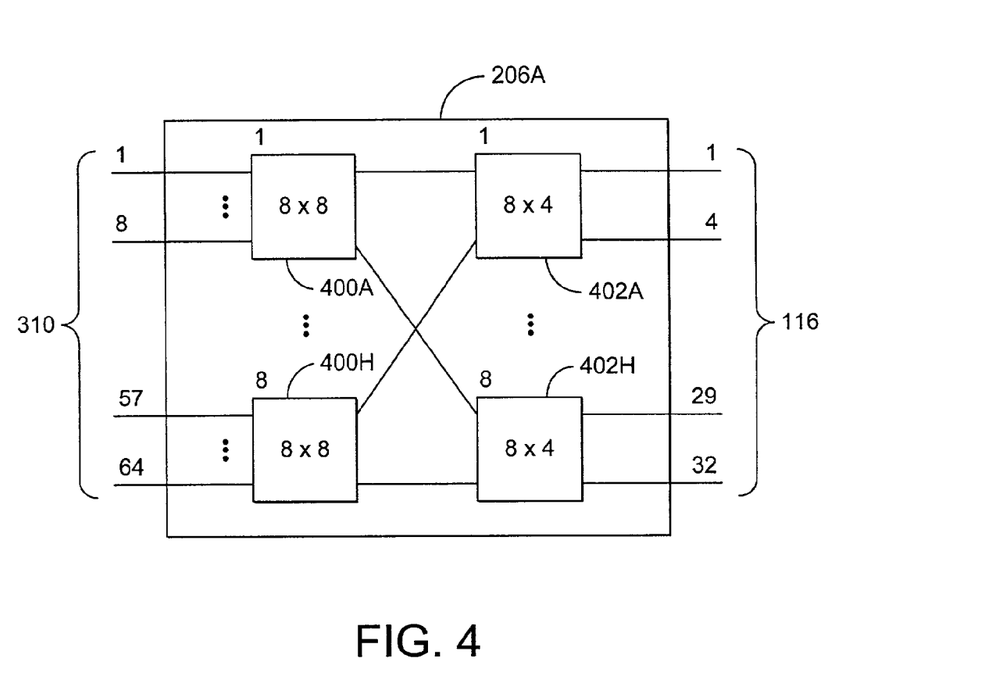
FIG. 4 illustrates an output switch module in accordance with the present invention.

FIG. 4 illustrates an exemplary output switch module in accordance with the present invention. Output switch module 206A, shown as a typical output switch module 206, is a concentrator, e.g., output switch module 206A receives the n input signals 310 from the input modules 204 and allows only m of the n input signals 310 to be output signals 116 from output switch module 206A. Every output 116 of an output switch module 206A is connected to a demodulator 108 that demodulates one of the d subbands. Since each output 116 is identical, the output switch module 206A does not have to be fully connected as in the related art, but the output switch module 206A should ensure that in any arrangement of inputs 310, the subset of inputs 310 must be switchable to an output 116. Since each group of c cells cannot use more than d demodulators, m, which is the number of demodulators of one type, must be less than or equal to n, the number of frequency reuse groups.

The complexity of the output switch modules 206 may vary greatly with n and m. For example, if m=n, then the output switch modules 206 become straight connections from input 310 to output 116 with no switching required. However, If n is the square of a number, it is possible to build the output module from simpler submodules. As an example shown in FIG. 4, if input signals 310 number 64 and the output signals 116 number 32, it is possible to build the output switch module 206 using eight 8×8 input submodules 400A–400H and eight 8×4 output submodules 402A–402H Since all of the outputs of the output module 206 are identical, the output module does not have to be fully connected, which allows the present invention to implement a switching scheme that is simpler than a crossbar architecture for the output module 206. However, the output switch module 206A as shown is fully connected, which allows for any traffic pattern on the ground that is supported by frequency reuse rules and by the capacity of the processor to be supported by the output switch module 206. This way, if the traffic distribution changes during the life of the satellite, the switch matrix can be reconfigured to support the new traffic distribution.

Constructing the output switch matrix 206 out of simpler submodules 400 and 402 makes it easier to manufacture and test the design of the present invention over that of a full crossbar switch. Modules can be produced and tested separately from the rest, and the production of numerous identical modules can make product design easier.

In the discussion above, it is assumed that the outputs of each output submodule 402A–402H are connected to different types of demodulators with each type demodulating a different subband. The output switch module 206, however, can be used with any payload that has multiple uplink beams with frequency reuse and has some sort of processing, analog or digital, that splits the uplink band into several subbands.

Alternative Embodiments of the Present Invention

Figure 5:
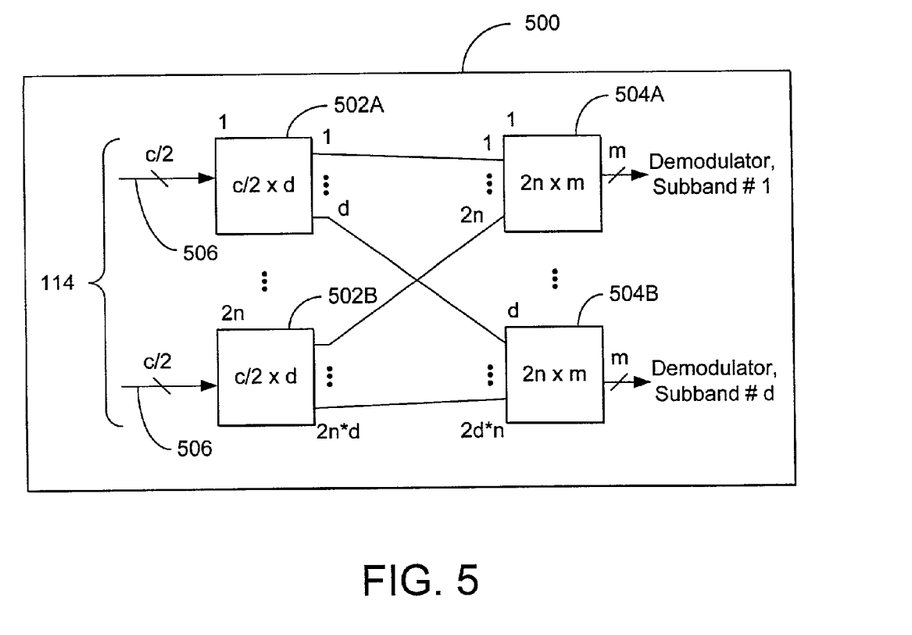
FIG. 5 illustrates a switch matrix in accordance with the present invention that is used in dual-polarized uplink configurations.

FIG. 5 illustrates a switch matrix in accordance with the present invention that is used in dual-polarized uplink configurations. Satellite systems often use a dual polarized uplink, with some signals transmitted up with right-hand circularly polarized (RHCP) carriers with the others using left-hand circularly polarized (LHCP) carriers. In some systems, users in a particular uplink beam are constrained to use only one polarization, so that half of the uplink beams use RHCP and the other half of the uplink beams use LHCP.

As shown in FIG. 5, system 500 divides the uplink beams 114 in half. One-half of the uplink beams 114 in a reuse group will be LHCP, and are grouped in one input module 502A, while the other input beams are RHCP and are grouped in a separate input module 502B. The resultant system 500 has twice the number of input modules 502A–502B as system 200, but each input module 502A–502B has one-half the number of inputs as input modules 204A–204N.

Since both polarizations are used in system 500, the maximum capacity of the spacecraft is doubled which means twice the number of demodulators 108 can be employed by the spacecraft. As such, m, the number of demodulators, may be as large as 2n, the number of reuse patterns on the ground, since every reuse pattern may use both polarizations. Therefore, the output switch modules 504A–504B should contain inputs numbering 2n, and outputs numbering m.

FIG. 5 illustrates the case where the number of uplink beams 114 is even. However, the number of uplink beams 114 can be an odd number, thereby making exact division by two impossible. If the number of uplink beams 114 is an odd number, the c/2 input beams 506 number (c+1)/2, and the number of inputs 508 to the output switch modules 504A–504B number 2c*n/(c+1).

Figure 6:
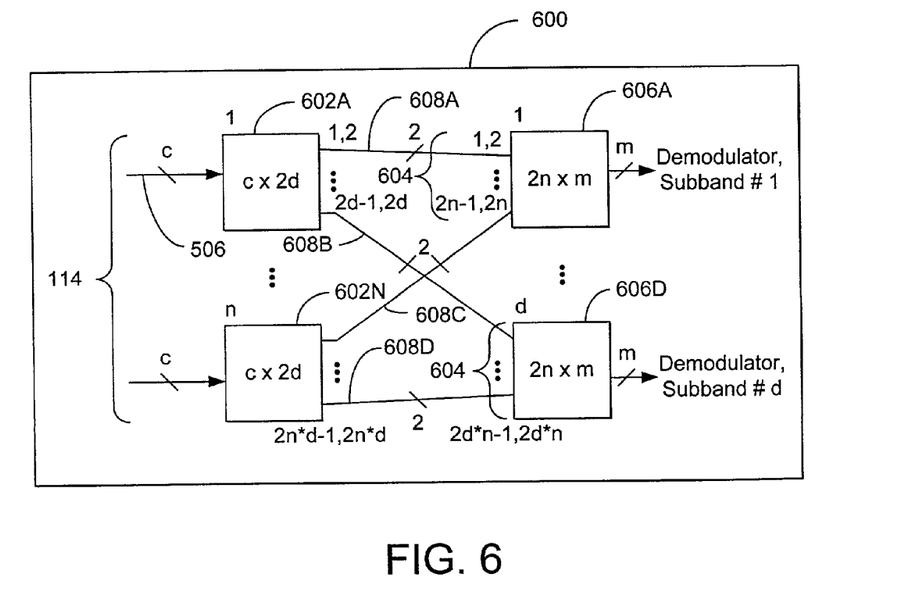
FIG. 6 illustrates a switch matrix in accordance with the present invention that is used in dual-polarized uplink configurations with varying polarizations within an uplink beam.

FIG. 6 illustrates a switch matrix in accordance with the present invention that is used in dual-polarized uplink configurations with varying polarizations within an uplink beam. As discuss with respect to FIG. 5, some satellite systems use polarized uplink beams. FIG. 5 illustrated the scenario that described users in a particular uplink beam that are constrained to use only one polarization. The scenario of FIG. 5 was limited to a fixed polarization for each uplink beam, but this polarization may change over the life of the satellite. FIG. 6 illustrates a switch matrix that can be used in such a scenario.

System 600 utilizes an input signal 114 from every cell c in the reuse group, but doubles the number of outputs from each input switch module 602A–602N to twice the number of bandwidths, i.e., 2d. To accommodate the increased number of outputs from input switch modules 602A–602N, the number of inputs 604 to each output switch module 606A–606D is increased to twice the number of the reuse patterns on the ground, or 2n. As with FIG. 5, since both polarizations are used, the maximum capacity of the spacecraft is doubled, so that the number of demodulators 108, or m, can be as large as 2n. However, in system 600, each input switch module 602 has two outputs 608A–608D that are coupled to an output switch module 606A–606D, e.g., input switch module 602A has two outputs 608A coupled to inputs 604 numbers 1 and 2 on output switch module 606A. System 600 can also be used to provide redundancy within the system, for example, if output 1 of input switch module 602A were to fail, output 2 can still connect input switch module 602A to output switch module 606A.

Figure 7:
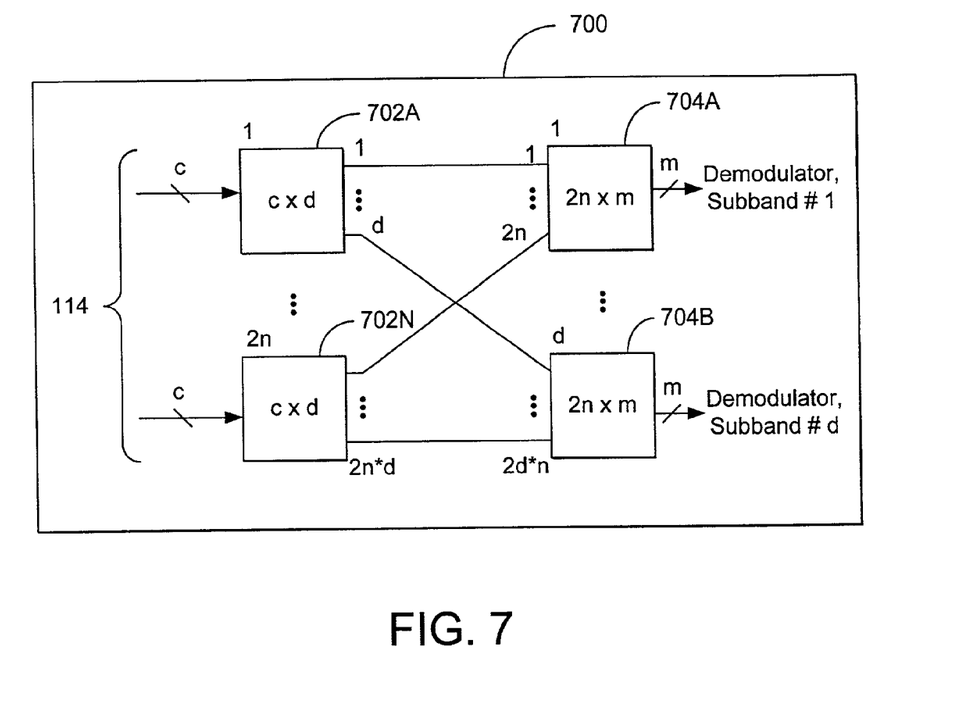
FIG. 7 illustrates a switch matrix in accordance with the present invention that can use multiple polarizations simultaneously.

FIG. 7 illustrates a switch matrix in accordance with the present invention that can use multiple polarizations simultaneously. System 700 illustrates a system that uses an uplink antenna with two output ports per beam, one for each polarization. This use of two output ports doubles the number of antenna outputs, which doubles the number of inputs 114 to the number of inputs to the switch matrix 700. The number of input switch modules 702A–702N has doubled to 2n, one input switch module 702A–702N for each cell group. As with FIGS. 5 and 6, the maximum capacity of the spacecraft is doubled since both polarizations are used, and therefore, the number of demodulators may be as large as twice the number of cell patterns on the ground, which forces the number of inputs to the output switch modules 704A–704D to be 2n and the number of outputs to be m, where m may be as large as 2n.

Redundancy Designs

The designs of FIGS. 2–7 are all somewhat vulnerable to single point failures. However, redundancy can be designed into a switch matrix of the present invention to avoid single point failures within the spacecraft. For example, if a switch on an output port of an output module 206A fails, the demodulator 108 that follows the switch is no longer useable, because the demodulator 108 will no longer receive an input. For this reason, additional demodulators 108 in each subband can be installed to allow a signal to be rerouted through the switch matrix of the present invention for that subband.

The present invention can also have redundancy built in to avoid single point failures within the matrix itself. For example, referring to FIG. 2, there are n*d interconnections between the input switch modules 204A–204N and the output switch modules 206A–206D. Since there are only m*d outputs 116, and m<n, some of the interconnections between input switch modules 204A–204N and output switch modules 206A–206D have no usable signals going through them. If some of the switches are lost on either side of these interconnections, which would render those switches unusable, the impact to the system is typically not very large.

On the other hand, the loss of an input port to the switch matrix is very serious. Referring again to FIG. 2, if one of the input ports receiving uplink beams 114 is not useable, the uplink beam 114 connected to that port is also unusable. This leads to a hole in the coverage of the satellite where terminals can not uplink to the satellite. Although the input port is connected to a 1:c power splitter, and this passive device typically does not fall nearly as much as an active switch, the small chance of failure is often unacceptable. In these cases, the input module can be redesigned to make it more redundant.

Figure 8:
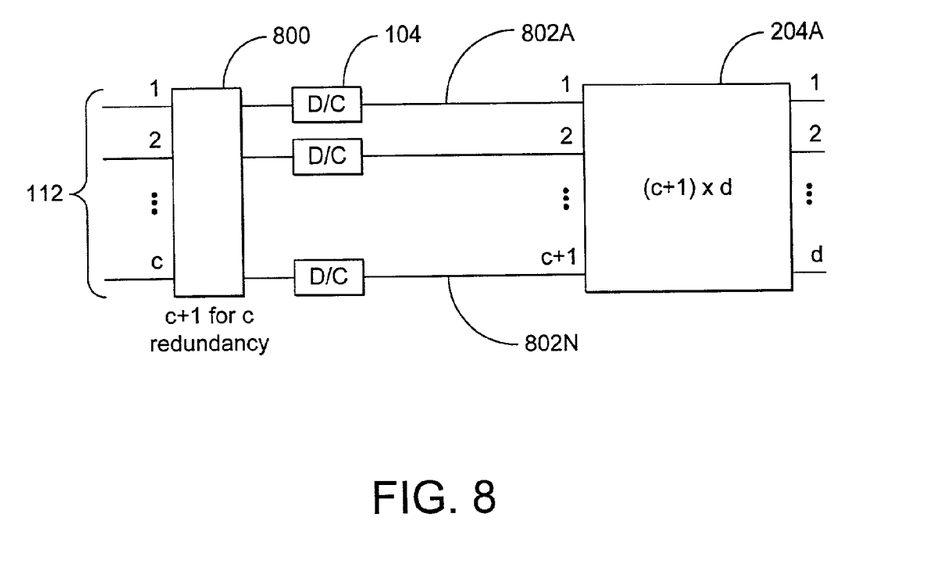
FIG. 8 illustrates a single input module with redundant input connections in accordance with the present invention.

FIG. 8 illustrates a single input module with redundant input connections in accordance with the present invention.

Typically, the input to the switch matrix includes a downconverter 104 as shown in FIG. 1. The input redundancy for the switch matrix can be combined with the downconverter 104 redundancy. For example, uplink cells 112, instead of being input directly into downconverters 104, are input to a redundancy matrix 800. Redundancy matrix can be used to supply any level of redundancy, but for ease of explanation, a c+1 for c redundancy is described herein. For example, since there are c cells in a reuse group, one additional output is provided from each redundancy matrix 800 to prevent a failure of an input port on input switch module 204A from being a single point failure for a given uplink beam 112. This provides inputs 802A to 802N to input switch module 204A, which is now a (c+1)×d matrix.

It can be seen that additional redundancy or alternative redundancy schemes can be provided by making redundancy matrix 800 a c+n for c matrix, and input switch module a (c+n)×d matrix.

Figure 9:
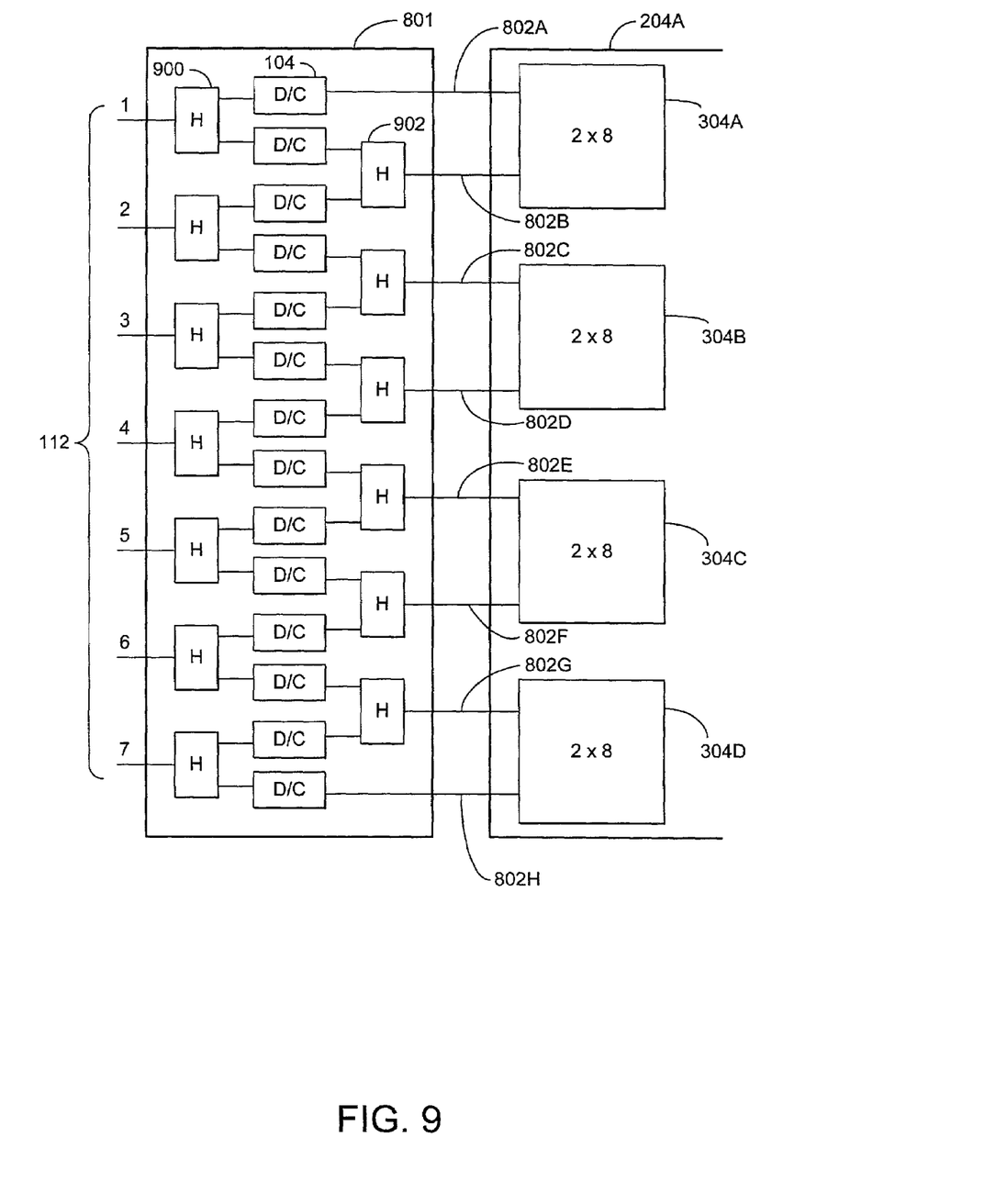
FIG. 9 illustrates a specific example of a redundant input matrix of the present invention.

FIG. 9 illustrates another example of a redundant input matrix of the present invention, related to the embodiment of FIG. 5. Input beams 112 for a four cell reuse system having a fixed polarization per cell will use 4 inputs to redundancy matrix 801, which provides an eight-for-seven redundancy. Redundancy matrix 801 will produce eight outputs for a single polarization, namely 802A through 802H. Each output 802A through 802H is provided to input switch module 204A, and modules 304A through 304D respectively. There are a total of eight subbands, and therefore modules 304A through 304D produce 8 outputs. The downconverter 104 redundancy is 8 for 7 as are the inputs to input switch module 204A.

Redundancy matrix 800 also provides redundancy for each uplink beam 112. If an input to input switch module 204A fails, for example input 802A, uplink beam 112 number 1 can be rerouted to input 802B, which can then switch uplink beam 112 number 1 through input switch module 204A and module 304A. This is done by using hybrid 900 and hybrid 902, which can route the uplink beam 112 to either input 802A or 802B. Similar results can be achieved for all of the uplink beams 112.

Depending on how the downconverters 104 are configured, the signal from uplink beam 112 number 3 can be paired with the signal from uplink beam 112 number 2 or the signal from uplink beam number 4. Therefore, uplink beams 112 2, 3, and 4 should all have the same polarization assignment, and uplink beam 112 number 3 should originate from a cell that cannot share frequencies with uplink beam number 2 or uplink beam 112 number 4. Preferably, all of the uplink beams 112 assigned to the redundancy matrix 800 should have the same polarization assignments, and uplink beams 112 assigned to adjacent inputs should originate from cells that cannot share frequencies because they are in the same cell frequency reuse pattern.

While the design in FIG. 9 provides some redundancy in the downconverters 104 and input switch module 204A inputs, the design of FIG. 9 does not allow for two downconverters 104 in a single redundancy matrix 800 to fail, nor does it provide provide any redundancy for the input modules 304A–304D of the input switch module 204A.

Figure 10:
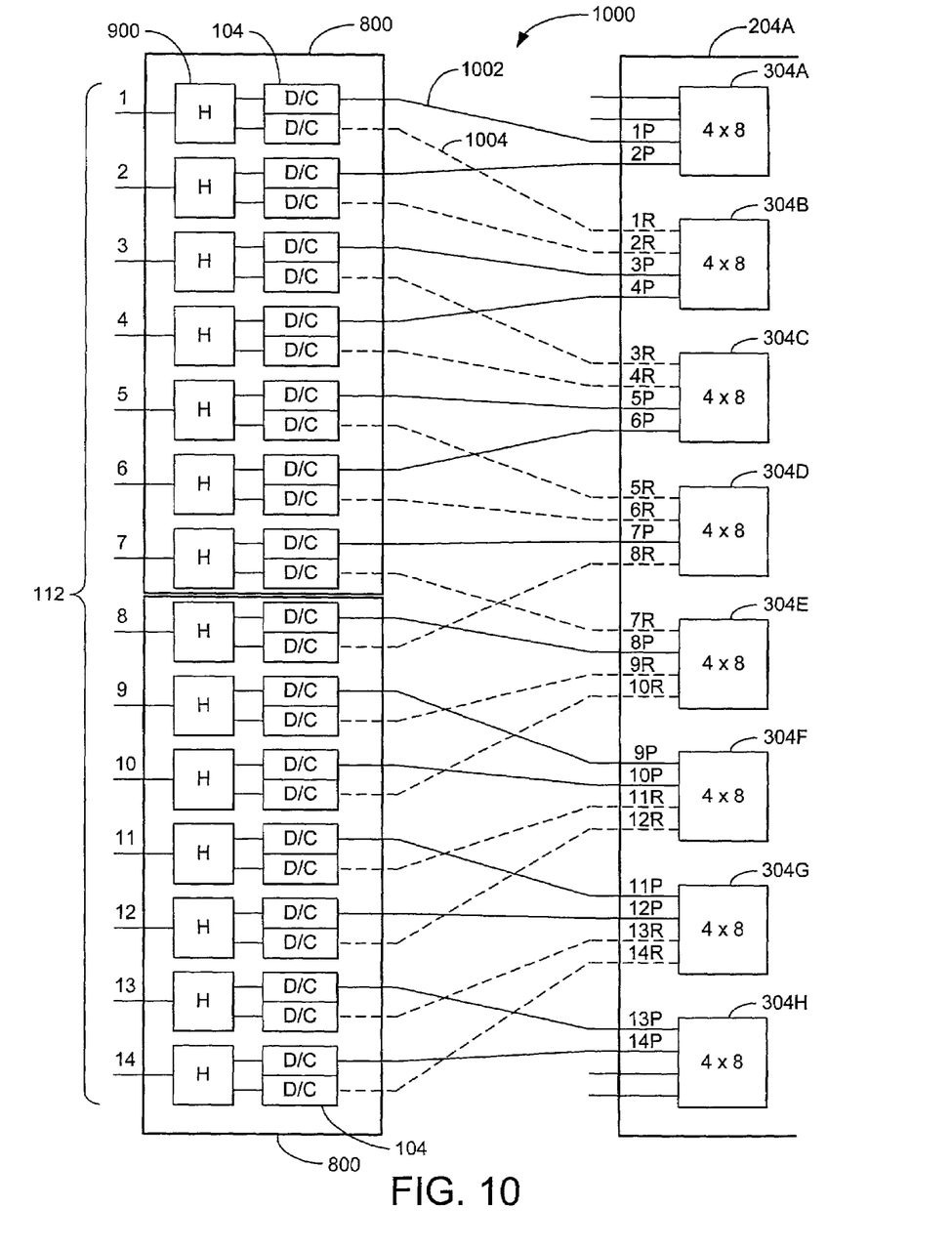
FIG. 10 illustrates a design that provides redundancy in the downconverters and in the input switch module of the present invention.

FIG. 10 illustrates a design that provides redundancy in the downconverters and in the input switch module of the present invention.

System 1000 comprises two redundancy matrices 800. Within each redundancy matrix 800, each uplink beam 112 is input to a hybrid power splitter 900, which has outputs to two different downconverters 104. This configuration makes downconverters 104 fully 2 for 1 redundant, so that more than one downconverter can fail in a single redundancy matrix 800.

Each uplink beam 112 is also sent to two different power splitter modules 304A–304H within input switch module 204A. For example the primary output for uplink beam 112 1002 is sent to an input on module 304A, while the redundant output for uplink beam 112 1004 is sent to an input on a different module 304B. With the configuration of FIG. 10, the input switch module 204A can survive the failure of 1 input module 304A–304H. As with FIG. 9, uplink beams 112 should be paired such that adjacent inputs should come from cells that have the same polarization assignment and are within the cell frequency reuse pattern.

Figure 11:
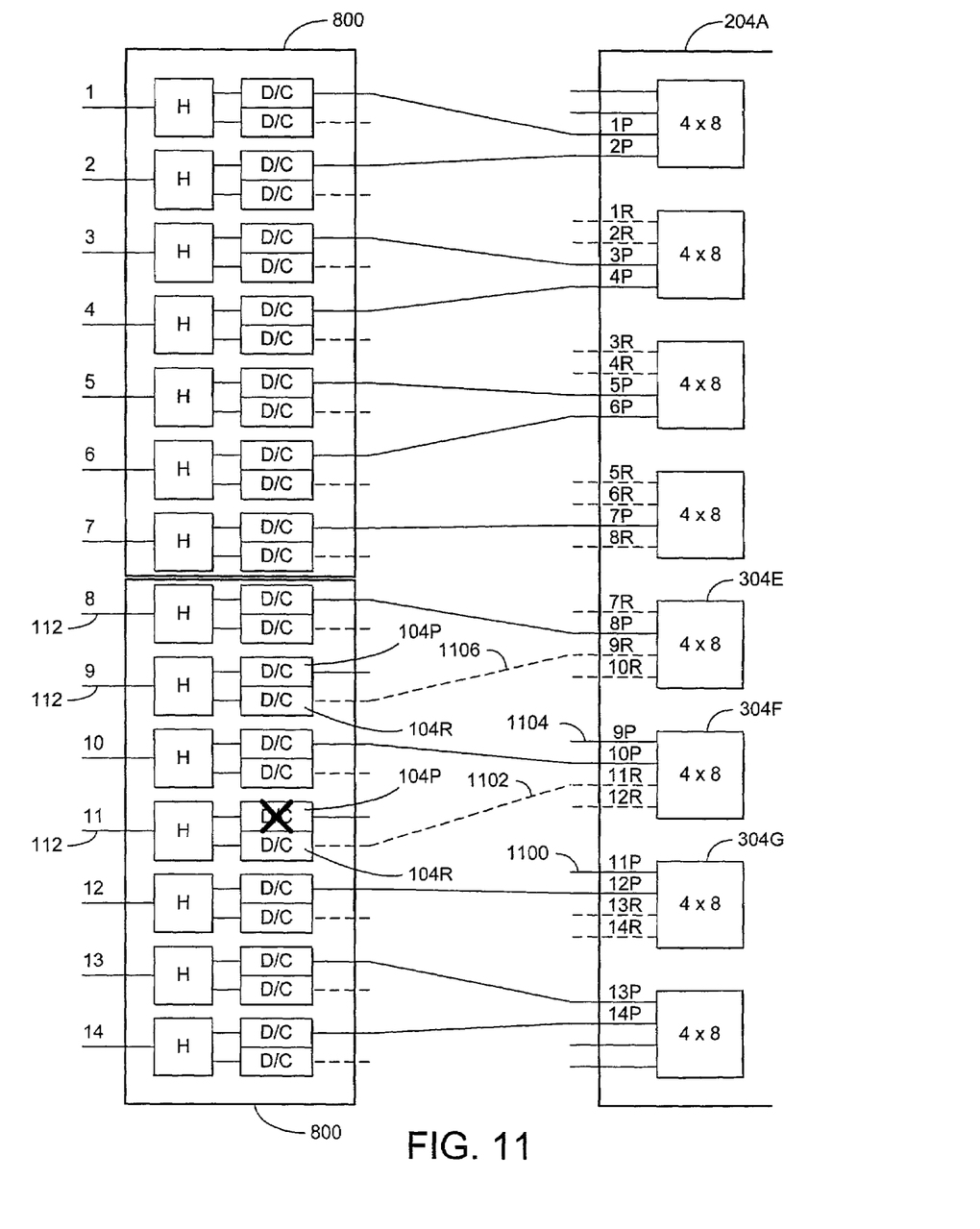
FIGS. 11 and 12 illustrate examples of failures within the configuration of FIG. 10.
Figure 12:
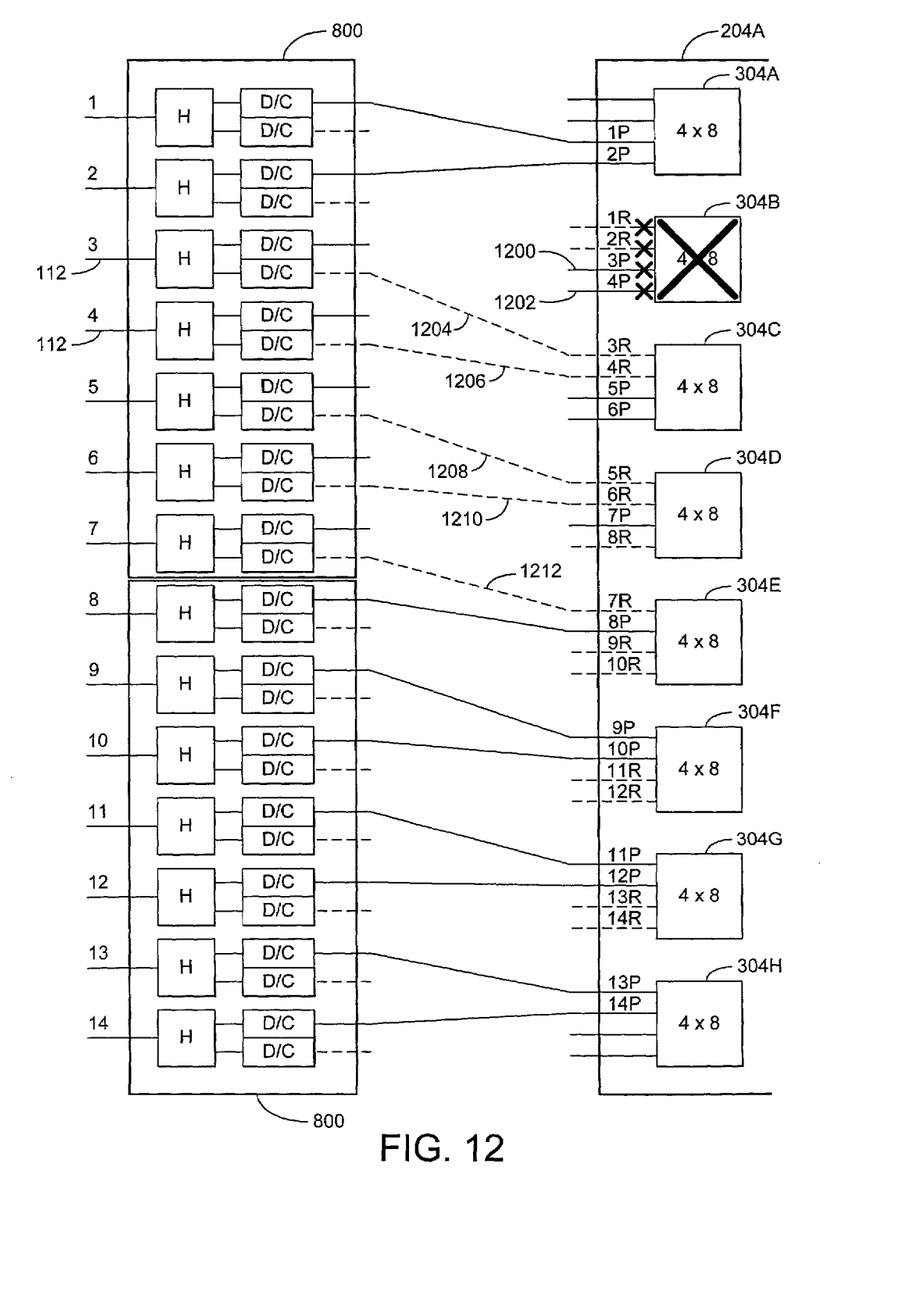

FIGS. 11 and 12 illustrate examples of failures within the configuration of FIG. 10. As shown in FIG. 11, the downconverter 104P, the primary downconverter 104 for uplink beam 112 number 11 has failed. The spacecraft, either through autonomous operation, monitoring of the downconverter 104P, or manual intervention, can switch to redundant downconverter 104R Input 1100 to module 304G will no longer receive inputs from downconverter 104P. However, uplink beam 112 number 11 can still be switched through input switch module 204A through input 1102 to module 304F. Other uplink beams 112 may also have to be switched through the input switch module 204A to prevent interference. For example, uplink beam 112 number 9 is typically not within a four cell reuse pattern with uplink beam 112 number 11, so uplink beam 112 number 9 is also switched to the redundant downconverter 104R associated with uplink beam 112 number 9. Input 1104 no longer receives input from uplink beam 112 number 9, which is switched through input switch module 204A through input 1105 on module 304E, and is paired with uplink beam 112 number 8. If the traffic density is low and if there is no need for uplink beam 112 number 9 to use the same subband as uplink beam 112 number 11, uplink beam 112 number 9 can continue on input 1104 through primary downconverter 104P until primary downconverter 104P fails, or the traffic in the region becomes heavy enough that uplink beam 112 number 9 and uplink beam 112 number 11 must use the same subband.

FIG. 12 illustrates an example where a module 304 in input switch module 204A fails. If module 304B fails, all of the inputs to module 304B become unusable by input switch module 204A The primary inputs 1200 and 1202 are associated with uplink beam 112 number 3 and uplink beam 112 number 4, which must be switched to redundant inputs 1204 and 1206, respectively.

Other switching may have to take place within input switch module 204A to maintain correct uplink beam 112 pairings. For example, uplink beams 112 numbers 5, 6, and 7 may also require switching to inputs 1208–1212 respectively to maintain proper pairing or traffic density. If the traffic density is low enough, some of the uplink beams 112 numbers 5, 6, and 7 may be kept with the associated primary downconverter 104, but whenever there are three active inputs on a single module 304 the ability of the payload to concentrate capacity on the associated cells may be impaired.

Figure 13:
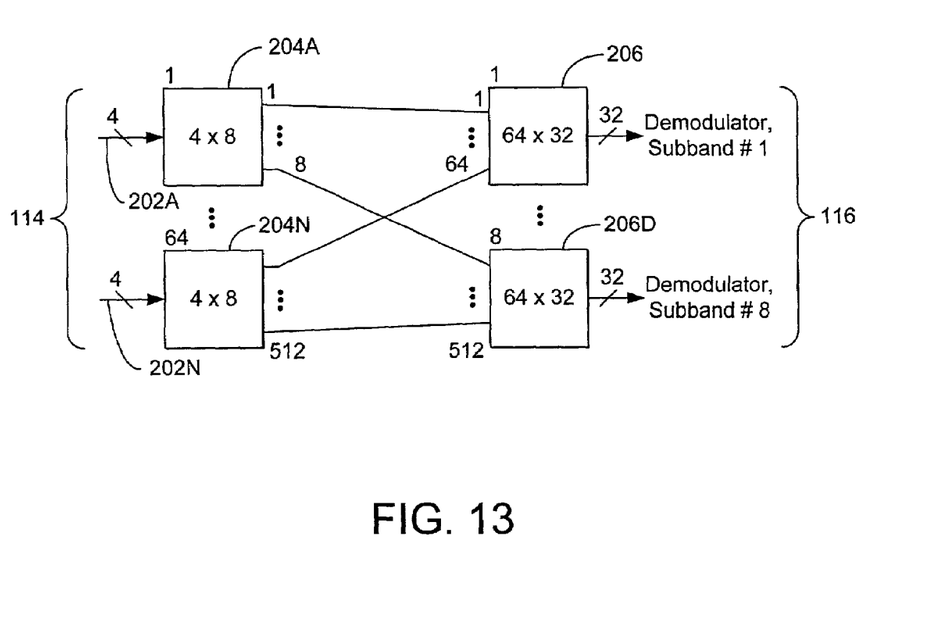
FIG. 13 illustrates a complete design of a switch matrix of the present invention.

FIG. 13 illustrates a complete design of a switch matrix of the present invention. For a four-cell reuse pattern with two polarizations, where each cell uses only one of the polarizations, the system 1300 of FIG. 13 can be employed. The design uses a total of 112 uplink cells, so there are 112 uplink beams 112 going into the downconverters 104. The downconverters 104 are 2 for 1 redundant, and the primary and redundant downconverters 104 have separate connections to the switch matrix, for a total of 224 connections. The input modules 304 have four inputs and eight outputs, and are connected to the downconverters 104 as shown in FIG. 10. The uplink bandwidth is broken into eight subbands, so there are eight different types of demodulators 108. There are thirty-two demodulators 108 used for each subband, although a smaller number, for example twenty-eight demodulators 108, are typically needed to meet capacity specifications. The extra four demodulators 108 in each subband can be used for redundancy.

Packaging

Figure 14A:
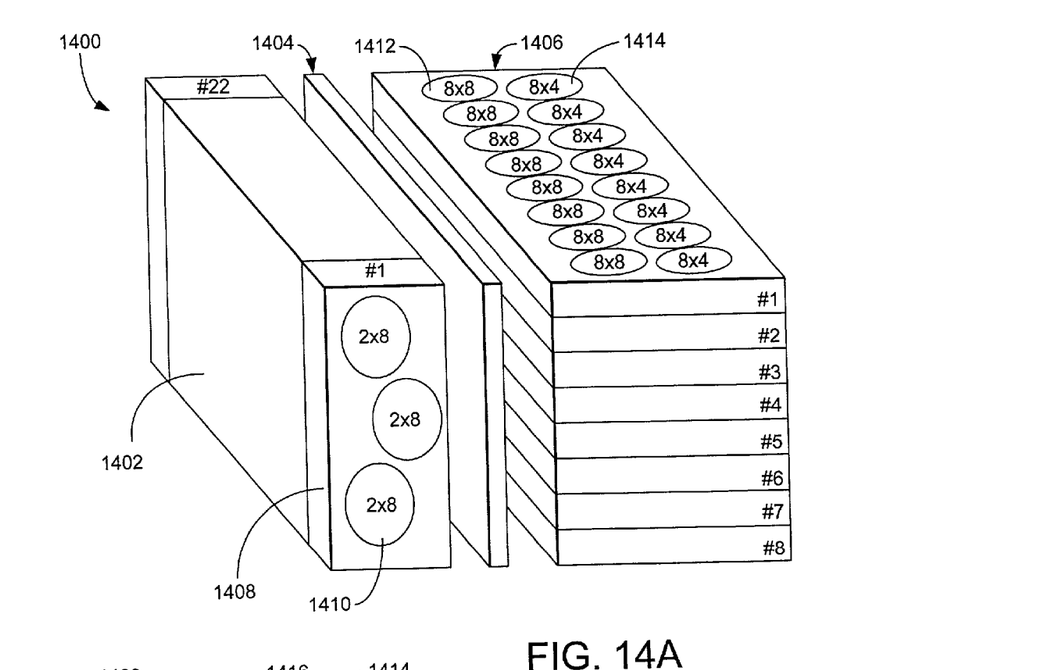
FIGS. 14A–14B illustrate the packaging of the present invention compared to the related art.
Figure 14B:
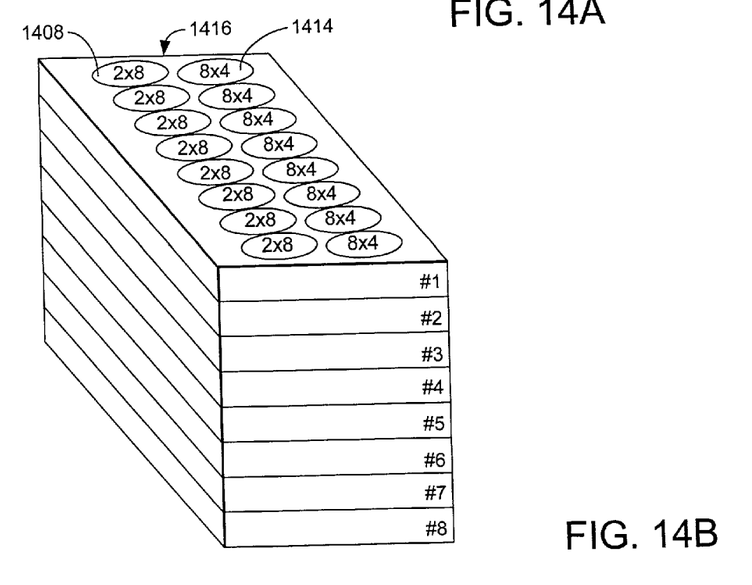

FIGS. 14A–14B illustrate the packaging of the present invention compared to the related art.

FIG. 14A illustrates a packaging scheme for the switch matrix of the present invention. Switch matrix 1400 consists of an input matrix 1402, an interface plate 1404, and an output matrix 1406. The input matrix has a number of "slices" 1408, each containing input modules 1410. Output matrix 1406 contains interconnect matrices 1412 and output modules 1414, and consists of a plurality of "slices" each containing interconnect matrices 1412 and output modules 1414. The input modules 1410 are connected to interconnect matrices 1412 through the interface plate 1404. As such, there are a large number of signals that must pass through interface plate 1404 to connect input modules 1410 to interconnect matrices 1412 properly.

FIG. 14B illustrates an alternative packaging design illustrating a simpler packaging design for switch matrix 1416 of the present invention. Switch matrix 1416 comprises input modules 1408 directly coupled to output modules 1414, without the need for interface plate 1404 or interconnect matrices 1412. This reduces the signal density, and therefore the complexity of switch matrix 1416, making switch matrix 1416 of the present invention easier to manufacture, test, and integrate into the spacecraft. However, switch matrix 1416 is not a fully connected matrix as the packaging design of FIG. 14A is. The switch matrix 1416 is thus less capable of in-flight redistribution of signals, because the beams are grouped into specific sections, and cannot be switched between one section and another. However, many applications may not require a fully connected matrix, and therefore, the packaging of FIG. 14B can be used to simplify the manufacture, testing, and integration of switch matrix 1416 into the spacecraft.

Process Chart

Figure 15:
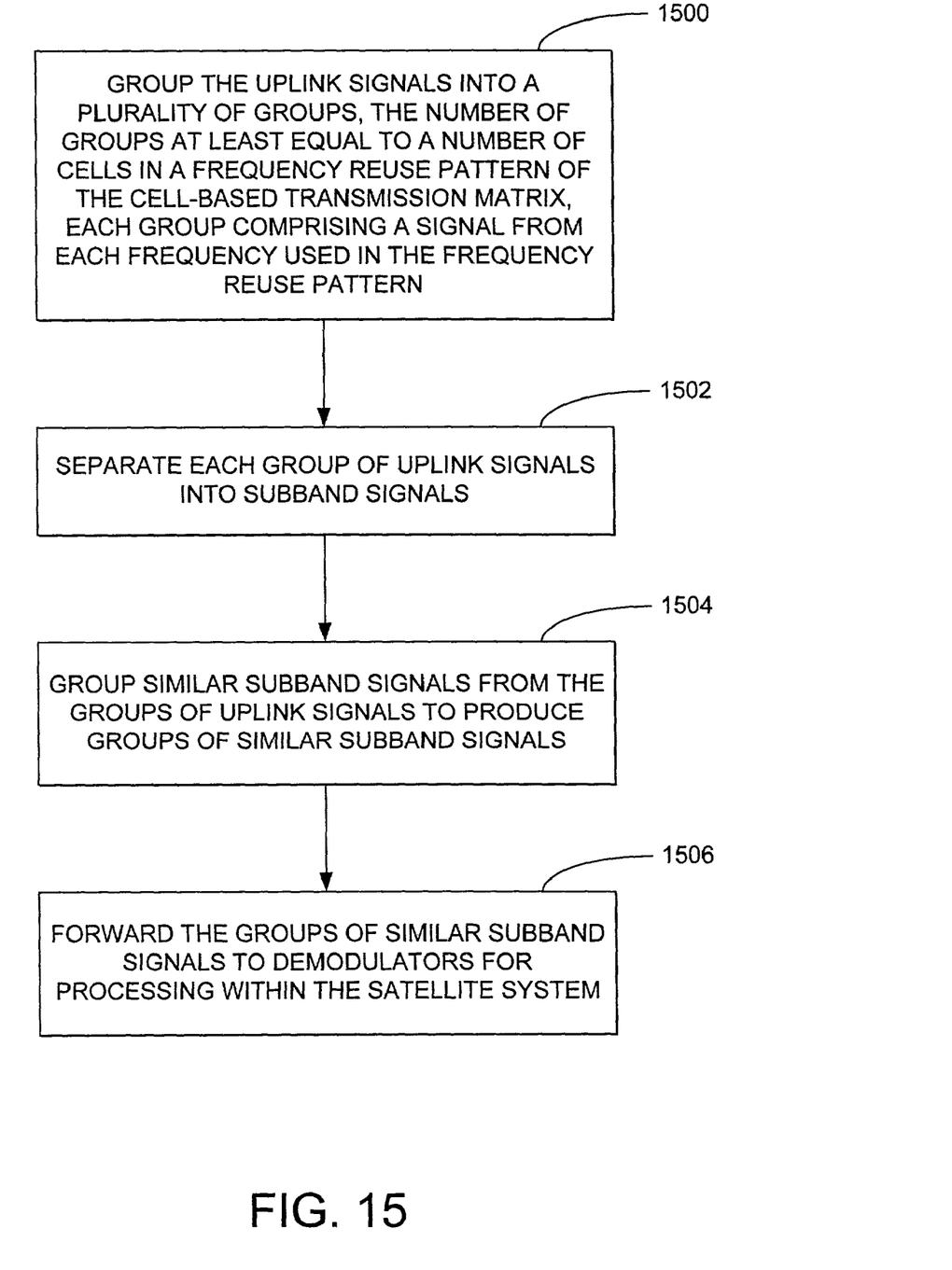
FIG. 15 is a flow chart illustrating the steps used to practice the present invention.

FIG. 15 is a flow chart illustrating the steps used to practice the present invention.

Block 1500 illustrates performing the step of grouping the uplink signals into a plurality of groups, the number of groups at least equal to a number of cells in the cell-based transmission matrix, each group comprising a signal from each frequency used in the frequency reuse pattern.

Block 1502 illustrates performing the step of separating each group of uplink signals into subband signals.

Block 1504 illustrates performing the step of grouping similar subband signals from the groups of uplink signals to produce groups of similar subband signals.

Block 1506 illustrates performing the step of forwarding the groups of similar subband signals to demodulators for processing within the satellite system.

CONCLUSION

This concludes the description of the preferred embodiment of the invention. The following paragraphs describe some alternative methods of accomplishing the same objects. The present invention, although described with respect to RF and electrical systems, can also be used with optical systems to accomplish the same goals. Further, the switches in the switch matrix can be actual switches, or hybrid electronics, or other switching mechanisms that perform similar functions.

In summary, the present invention discloses a method and apparatus for switching signals through a switch matrix. The apparatus comprises an input module and an output module. The input module has a plurality of inputs typically equal to a number of cells in a reuse pattern, and the inputs receiving at least one uplink beam. The input module also has a plurality of outputs, the plurality of outputs is typically equal to the number of subbands in the uplink beam. The output module is coupled to the input module and selectively couples the outputs from the input module to an output of the output module.

The method comprises the steps of grouping the uplink signals into a plurality of groups, the number of groups typically equal to a number of cells in the cell-based transmission matrix, where each group comprises a signal from each frequency used in the frequency reuse pattern. Each group of uplink signals is then separated into subband signals, which are then grouped together into groups of similar subband signals. The groups of similar subband signals are then forwarded to demodulators for processing within the satellite system.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A switch matrix for coupling an uplink beam to a demodulator, comprising:
   an input module, the input module having a plurality of inputs at least equal to a number of cells in a frequency reuse pattern, the inputs receiving at least one uplink beam, and a plurality of outputs, the plurality of outputs at least equal to a number of subbands in the uplink beam, wherein the input module comprises at least one power splitter, wherein a number of power splitters is at least equal to the number of cells in the frequency reuse pattern, wherein each power splitter splits each input into a plurality of substantially equal power outputs, a number of power outputs at least equal to the number of subbands; and
   an output module, the output module coupled to the input module, for selectively coupling the outputs from the input module to an output of the output module, the output of the output module coupled to a demodulator thereto.

2. The switch matrix of claim 1, wherein the output module is directly coupled to the input module.

3. The switch matrix of claim 1, wherein the input module comprises redundant modules.

4. The switch matrix of claim 1, wherein the input module accepts uplink beams of different polarizations.

5. The switch matrix of claim 4, wherein the input module accepts uplink beams of a single polarization.

6. A switch matrix for coupling an uplink beam to a demodulator in a satellite system, wherein the satellite system receives input from cells in a cell pattern, comprising:
   (a) a plurality of input modules, each having a plurality of inputs at least equal to a number of cells in a reuse pattern for the satellite system, each input module comprising:
      (1) a plurality of power splitters, wherein the plurality of power splitters is at least equal to the number of cells in the reuse pattern for the satellite system, wherein each power splitter splits each input into a plurality of substantially equal power outputs, a number of power outputs at least equal to a number of subbands used by the satellite system; and
      (2) a plurality of switch modules, coupled to the plurality of power splitters, each switch module accepting a plurality of inputs it least equal to the number of cell in the reuse pattern for the satellite system, the plurality of switch modules at least equal to the number of subbands used by the satellite system; and (b) a plurality of output modules, coupled to the input modules through the plurality of the switch modules, each having a plurality of inputs at least equal to the number of cells in the cell pattern, comprising:

(1) a first set of output matrices, each output matrix in the first set of output matrices having a plurality of inputs at least equal to the number of subbands used by the satellite system; and (2) a second set of output matrices, coupled to the first set of output matrices, each output matrix in the second set of output matrices having a plurality of outputs at least equal to a number of demodulators used by the satellite system in each subband.

7. The switch matrix of claim 6, wherein each output module is directly coupled to the input modules.

8. The switch matrix of claim 6, wherein the input modules comprise redundant modules.

9. The switch matrix of claim 6, wherein the input modules accept uplink beams of different polarizations.

10. The switch matrix of claim 6, wherein the input modules accept uplink beams of a single polarization.

* * * * *